United States Patent
Hwang et al.

(10) Patent No.: US 9,414,367 B2
(45) Date of Patent: Aug. 9, 2016

(54) METHOD AND APPARATUS FOR TRANSMITTING UPLINK CONTROL INFORMATION

(71) Applicant: LG ELECTRONICS INC., Seoul (KR)

(72) Inventors: Daesung Hwang, Anyang-si (KR); Dongyoun Seo, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 14/385,308

(22) PCT Filed: Mar. 15, 2013

(86) PCT No.: PCT/KR2013/002109
§ 371 (c)(1),
(2) Date: Sep. 15, 2014

(87) PCT Pub. No.: WO2013/137682
PCT Pub. Date: Sep. 19, 2013

(65) Prior Publication Data
US 2015/0043470 A1    Feb. 12, 2015

Related U.S. Application Data

(60) Provisional application No. 61/611,599, filed on Mar. 16, 2012.

(51) Int. Cl.
*H04W 4/00* (2009.01)
*H04W 72/04* (2009.01)
*H04L 1/00* (2006.01)
*H04L 5/00* (2006.01)

(52) U.S. Cl.
CPC ......... *H04W 72/0413* (2013.01); *H04L 1/0066* (2013.01); *H04L 1/0072* (2013.01); *H04L 5/0055* (2013.01); *H04L 5/0057* (2013.01)

(58) Field of Classification Search
None
See application file for complete search history.

(56) References Cited

U.S. PATENT DOCUMENTS

| | | | |
|---|---|---|---|
| 9,083,520 B2 * | 7/2015 | Lee | H04L 1/1671 |
| 9,166,758 B2 * | 10/2015 | Lee | H04L 5/0053 |
| 2007/0177566 A1 | 8/2007 | Xu et al. | |
| 2009/0006925 A1 * | 1/2009 | Pan | H04W 72/0413 714/758 |
| 2009/0201825 A1 * | 8/2009 | Shen | H04L 1/0026 370/252 |
| 2009/0221289 A1 | 9/2009 | Xu et al. | |

(Continued)

FOREIGN PATENT DOCUMENTS

| | | |
|---|---|---|
| KR | 10-2010-0108459 A | 10/2010 |
| KR | 10-2011-0008300 A | 1/2011 |

(Continued)

*Primary Examiner* — Michael J Moore, Jr.
(74) *Attorney, Agent, or Firm* — Birch, Stewart, Kolasch & Birch, LLP

(57) ABSTRACT

Provided is a method and an apparatus for transmitting uplink control information in a wireless communication system. A wireless device determines the number of a plurality of Reed-Muller (RM) encoders based on the number of bits of a bit sequence indicating uplink control information, and divides the bit sequence based on the determined number of the plurality of RM encoders to generate a plurality of sub-sequences. The wireless device inputs the plurality of sub-sequences into the respective plurality of RM encoders to generate a coded sequence, maps the coded sequence according to a modulation method to generate a plurality of modulated symbols, and transmits the plurality of modulated symbols on an uplink channel.

14 Claims, 10 Drawing Sheets

(56) References Cited

U.S. PATENT DOCUMENTS

| | | |
|---|---|---|
| 2009/0296850 A1 | 12/2009 | Xu et al. |
| 2011/0122846 A1* | 5/2011 | Yu .................... H03M 13/2903 370/335 |
| 2011/0243278 A1* | 10/2011 | Cheng ................ H03M 13/136 375/340 |
| 2012/0082157 A1* | 4/2012 | Yamada ............... H04L 1/0073 370/389 |
| 2012/0134306 A1* | 5/2012 | Cheng ................ H04L 1/0042 370/281 |
| 2012/0195265 A1 | 8/2012 | Kim et al. |
| 2012/0210187 A1* | 8/2012 | Yin .................... H03M 13/136 714/751 |
| 2012/0243511 A1* | 9/2012 | Lv ....................... H04L 1/0031 370/335 |
| 2012/0287828 A1* | 11/2012 | Chen .................... H04L 1/1614 370/280 |

FOREIGN PATENT DOCUMENTS

| | | |
|---|---|---|
| KR | 10-2011-0039154 A | 4/2011 |
| KR | 10-2012-0018051 A | 2/2012 |

* cited by examiner

METHOD AND APPARATUS FOR TRANSMITTING UPLINK CONTROL INFORMATION

CROSS REFERENCE TO RELATED APPLICATIONS

This application is the National Phase of PCT International Application No. PCT/KR2013/002109, filed on Mar. 15, 2013, which claims priority under 35 U.S.C. 119(e) to U.S. Provisional Application No. 61/611,599, filed on Mar. 16, 2012, all of which are hereby expressly incorporated by reference into the present application.

BACKGROUND OF THE INVENTION

1. Field of the Invention

The present invention relates to wireless communications, and more particularly, to a method and apparatus for transmitting uplink control information in a wireless communication system.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The uplink channel is used to transmit a variety of uplink control information such as hybrid automatic repeat request (HARQ) positive-acknowledgement (ACK)/negative-acknowledgement (NACK), channel state information (CSI), and scheduling request (SR).

With the introduction of a scheme of increasing channel capacity such as multiple input multiple output (MIMO) and carrier aggregation (CA), an amount of uplink control information is also increased. A radio resource for an uplink channel may be more restrictive than a radio resource for a downlink channel, and a transmission error of the uplink control information may aggravate service quality.

There is a need to design a coding and modulation scheme for an uplink channel according to an increasing amount of the uplink control information.

SUMMARY OF THE INVENTION

The present invention provides a method and apparatus for transmitting uplink control information.

According to one aspect of the present invention, a method of transmitting uplink control information in a wireless communication system is provided. The method may comprise: determining the number of a plurality of Reed-Muller (RM) encoders according to the number of bits of a bit sequence indicating the uplink control information; generating a plurality of sub-sequences by dividing the bit sequence according to the number of the plurality of RM encoders; generating a coded sequence by inputting the plurality of sub-sequences to the respective plurality of RM encoders; generating a plurality of modulation symbols by mapping the coded sequence according to a modulation scheme; and transmitting the plurality of modulation symbols on an uplink channel, wherein the plurality of sub-sequences have the same length or a difference thereof is 1.

The method may further comprise: determining the modulation scheme according to the number of bits of the bit sequence.

The uplink control information may include first uplink control information and second uplink control information. A coded bit corresponding to the first uplink control information may mapped to a bit corresponding to a most significant bit (MSB) for the plurality of modulation symbols.

The first uplink control information may include hybrid automatic repeat request (HARQ)/positive-acknowledgement (ACK)/negative-acknowledgement (HACK), and the second uplink control information includes channel state information (CSI).

According to one aspect of the present invention, an apparatus for transmitting uplink control information in a wireless communication system is provided. The apparatus may comprise: a radio frequency (RF) unit for transmitting and receiving a radio signal; and a processor operatively coupled to the RF unit, wherein the processor is configured for: determining the number of a plurality of Reed-Muller (RM) encoders according to the number of bits of a bit sequence indicating the uplink control information; generating a plurality of sub-sequences by dividing the bit sequence according to the number of the plurality of RM encoders; generating a coded sequence by inputting the plurality of sub-sequences to the respective plurality of RM encoders; generating a plurality of modulation symbols by mapping the coded sequence according to a modulation scheme; and transmitting the plurality of modulation symbols on an uplink channel, wherein the plurality of sub-sequences have the same length or a difference thereof is 1.

Various types of uplink control information with an increased amount can be transmitted while utilizing the conventional uplink channel structure.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after a radio resource control (RRC) connection is established, and may be used to provide an additional radio resource. At least one primary cell is configured always. The secondary cell may be added/modified/released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
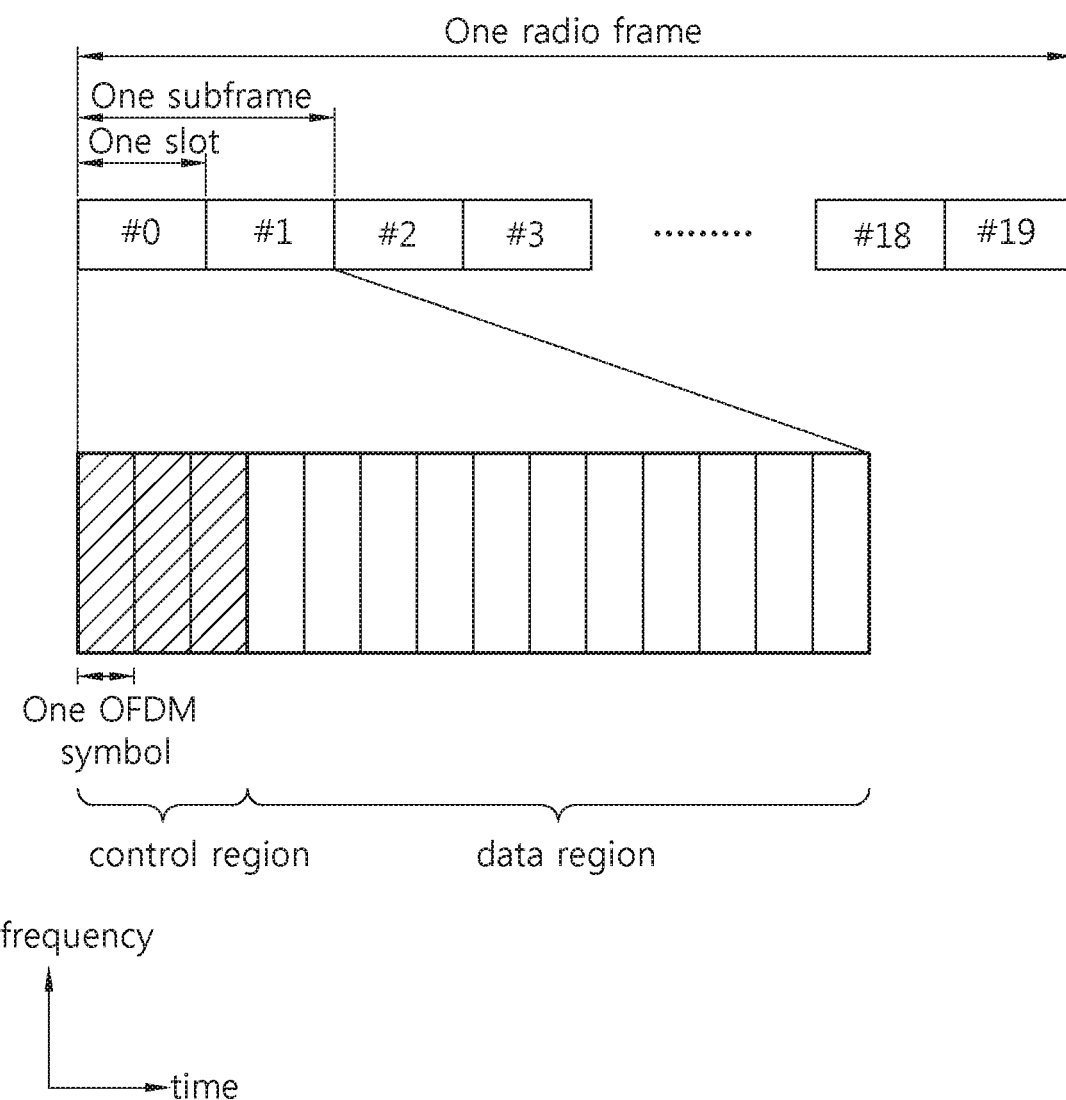
FIG. 1 shows a downlink radio frame structure in $3^{rd}$ generation partnership project (3GPP) long term evolution (LTE).

FIG. 1 shows a structure of a DL radio frame in 3GPP LTE. The section 4 of 3GPP TS 36.211 V10.4.0 (2011-12) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.4.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As described in 3GPP TS 36.211 V10.4.0, in 3GPP LTE, a physical channel may be divided into a data channel and a control channel. The data channel may be a physical downlink shared channel (PDSCH) and a physical uplink shared channel (PUSCH). The control channel may be a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. ABS determines a PDCCH format according to DCI to be transmitted to a wireless device, attaches a cyclic redundancy check (CRC) to control information, and masks a unique identifier (referred to as a radio network temporary identifier (RNTI)) to the CRC according to an owner or usage of the PDCCH.

According to 3GPP TS 36.211 V10.4.0, an uplink channel includes a PUSCH, a PUCCH, a sounding reference signal (SRS), and a physical random access channel (PRACH).

Figure 2:
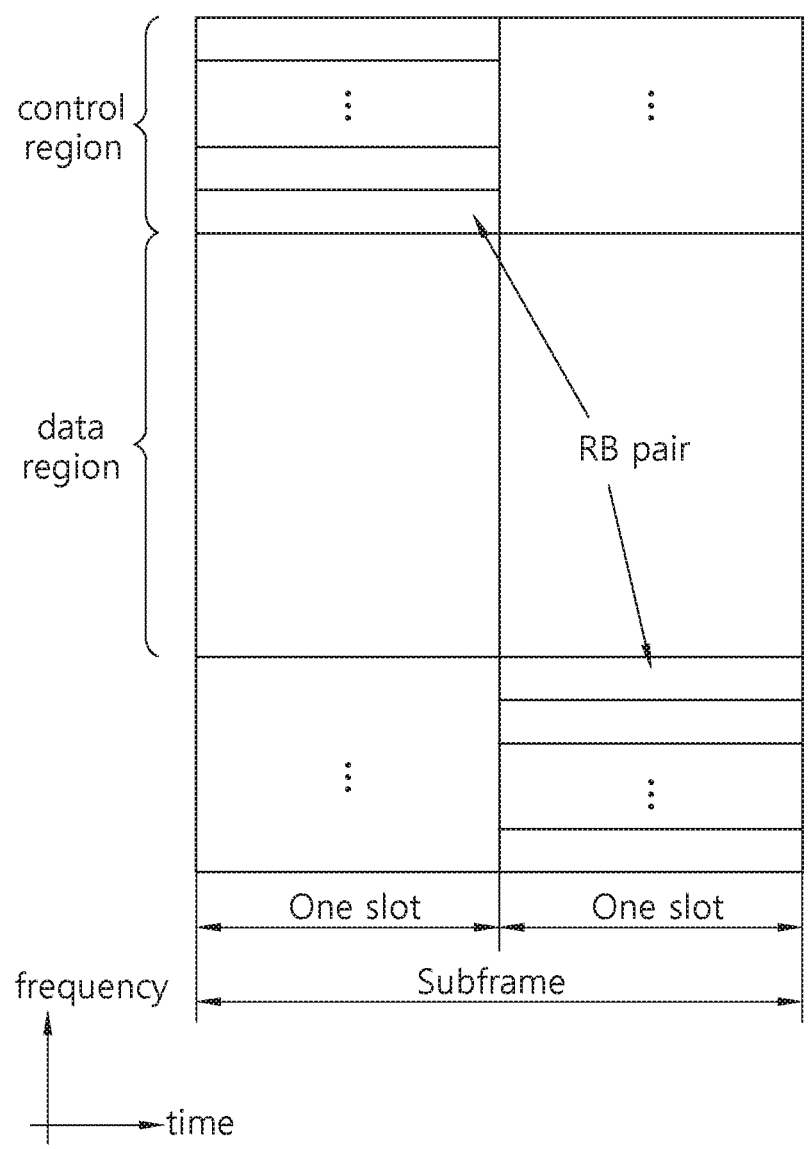
FIG. 2 shows a structure of an uplink (UL) subframe in 3GPP LTE.

FIG. 2 shows a structure of a UL subframe in 3GPP LTE.

The UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. m is a location index indicating a logical frequency-domain location of the RB pair allocated to the PUCCH in the subframe. It shows that RBs having the same value m occupy different subcarriers in the two slots.

The PUSCH is allocated by a UL grant on a PDCCH. Although not shown, a $4^{th}$ OFDM symbol of each slot of a normal CP is used in transmission of a demodulation reference signal (DM RS).

Uplink control information (UCI) includes at least any one of HARQ ACK/NACK, channel state information (CSI), and scheduling request (SR). Hereinafter, as an index of indicating a state of a DL channel, the CSI may include at least any one of a channel quality indicator (CQI) and a precoding matrix indicator (PMI).

Various methods are used for UCI transmission.

First, UCI may be transmitted alone or together with a UL transport block on a PUCSH. This is called UCI multiplexing.

Figure 3:
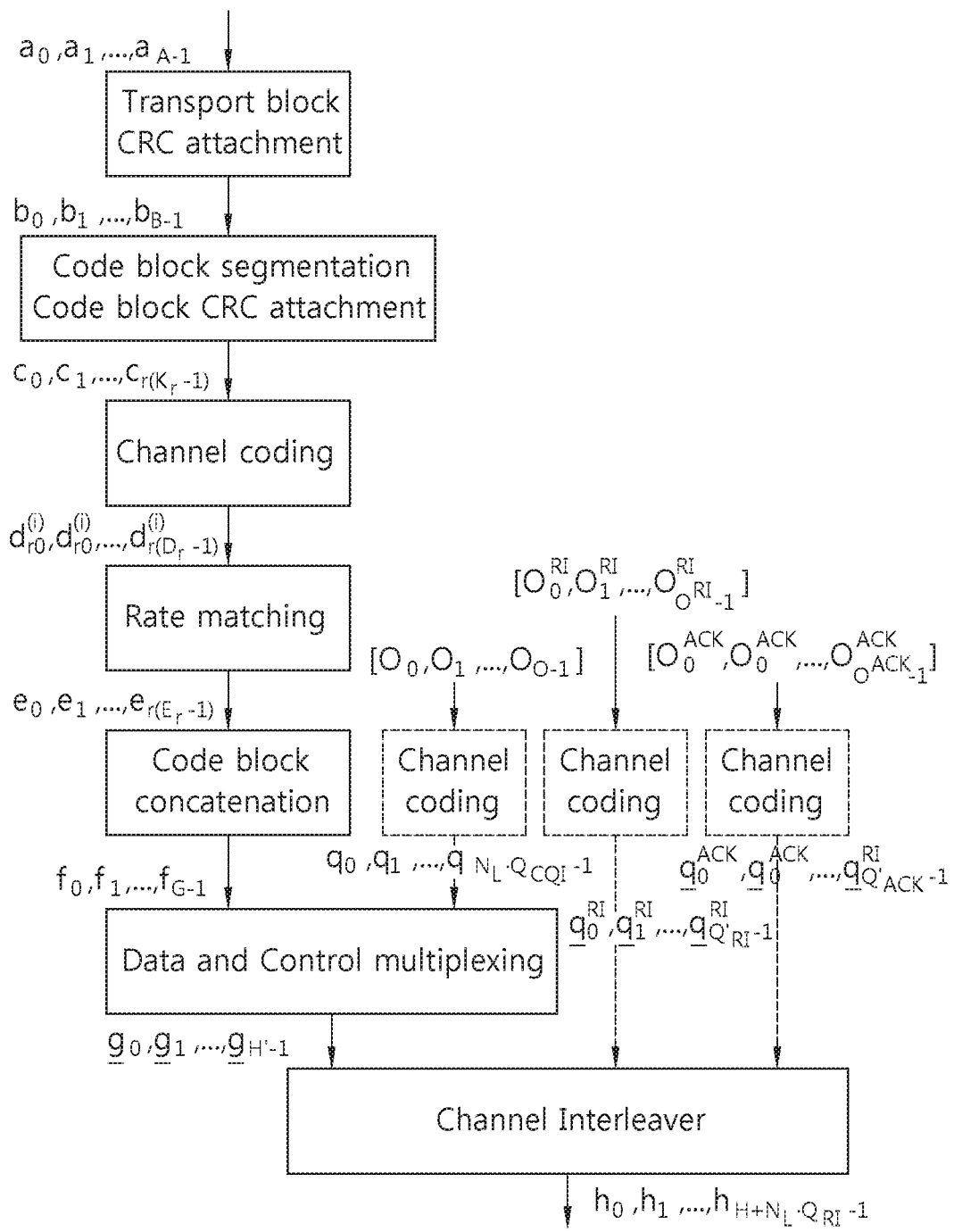
FIG. 3 shows an example of uplink control information (UCI) multiplexing for physical uplink shared channel (PUSCH) transmission in 3GPP LTE.

FIG. 3 shows an example of UCI multiplexing for PUSCH transmission in 3GPP LTE. The section 5 of 3GPP TS 36.212 V10.4.0 (2011-12) "Evolved Universal Terrestrial Radio Access (E-UTRA); Multiplexing and channel coding (Release 10)" may be incorporated herein by reference.

Data bits $a_0, a_1, \ldots, a_{A-1}$ are provided in every TTI in a format of one transport block. First, cyclic redundancy check (CRC) parity bits $p_0, p_1, \ldots, p_{L-1}$ are attached to the data bits $a_0, a_1, \ldots, a_{A-1}$ to generate CRC-attached bits $b_0, b_1, \ldots, b_{B-1}$. Herein, B=A+L.

The CRC-attached bits $b_0, b_1, \ldots, b_{B-1}$ are segmented in a code block unit, and the CRC parity bits are re-attached in the code block unit. $c_{r0}, c_{r1}, \ldots, c_{r(Kr-1)}$ denote a bit sequence output after the code block segmentation. Herein, if the total number of code blocks is C, r denotes a code block number, and Kr denotes the number of bits for the code block number r.

Channel coding is performed on a bit sequence for a given code block. $d^{(i)}_0, d^{(i)}_1, \ldots, d^{(i)}_{D-1}$ denote encoded bits, D denotes the number of encoded bits for each output stream, and i denotes an index of a bit stream output from an encoder.

Rate matching is performed on the encoded bits. Then, code block concatenation is performed on the rate-matched bits. As a result, a data bit sequence $f_0, f_1, \ldots, f_{G-1}$ is generated. Herein, G denotes the total number of encoded bits used to transmit bits other than bits used in control information transmission when the control information is multiplexed on a PUSCH.

The UCI is coded independently in a format of CSI, rank indicator (RI), and HARQ ACK/NACK.

Hereinafter, CSI coding is described.

Channel coding is performed on CQIs $o_0, o_1, \ldots, o_{O-1}$ (where O is the number of CQI bits) to generate a control information bit sequence $q_0, q_1, \ldots, q_{Q-1}$. $N_L$ is the number of layers to which a UL transport block is mapped, and $Q_{CQI}$ is the number of bits per layer that can be used for the CSI.

For example, a (32, O) block code (also referred to as a Reed-Muller (RM) code) may be used as channel coding for the CQI.

$b_0, b_1, \ldots, b_{31}$ denote an intermediate sequence for CQI channel coding and can be generated by the following equation.

$$b_i = \sum_{n=0}^{O-1} (o_n E M_{i,n}) \bmod 2 \qquad \text{[Equation 1]}$$

Herein, i=0, 1, ..., 31. $M_{i,n}$ is a basis sequence for the (32, O) block code, and may be defined as the following table.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 0 | 1 | 1 | 1 | 1 | 1 | 0 |
| 25 | 1 | 1 | 0 | 0 | 0 | 1 | 1 | 1 | 0 | 0 | 1 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The control information bit sequence $q_0, q_1, \ldots, q_{Q-1}$ is generated by circularly repeating the intermediate sequence $b_0, b_1, \ldots, b_{31}$ according to the following equation.

$$q_i = b_{(i \bmod 32)} \quad [\text{Equation 2}]$$

Herein, $i=0, 1, \ldots, N_L Q_{CQI}-1$.

A data bit sequence $f_0, f_1, \ldots, f_{G-1}$ is multiplexed together with the CSI bit sequence into a multiplexed sequence $g_0, g_1, \ldots, g_{H-1}$. In the multiplexed symbol sequence, the CSI may be first arranged, and thereafter a UL transport block may be arranged. H denotes the total number of bits allocated to the PUSCH, and is defined as $H=G+N_L Q_{CQI}$. Herein, $q_i$ is a modulation symbol on constellation, and $H'=H/Q_m$. $Q_m$ denotes the number of bits for each modulation symbol of a modulation scheme. For example, when quadrature phase shift keying (QPSK) is used as the modulation scheme, $Q_m=2$.

When the SR and the ACK/NACK are simultaneously transmitted, the PUCCH format 1 is used, and in this transmission, the ACK/NACK signal is modulated by using a resource allocated to the SR.

Channel coding for the PUCCH format 2 is as follows.

UCI (e.g., CSI) $u_0, u_1, \ldots, u_{A-1}$ (where A is the number of bits of the UCI) is subjected to channel coding to generate an encoded bit sequence $b_0, b_1, \ldots, b_{B-1}$. B is the number of bits capable of transmitting a corresponding PUCCH. Since the PUCCH format 2 can transmit 20-bit coded UCI, B=20.

A (20, A) block code (or also referred to as a Reed-Muller (RM) code) may be used as channel coding for the PUCCH format 2. This can be expressed as follows.

$$b_i = \sum_{n=0}^{A-1} (u_n \cdot M_{i,n}) \bmod 2 \quad [\text{Equation 3}]$$

Herein, $i=0, 1, \ldots, B-1$. $M_{i,n}$ is a basis sequence for a (20, A) block code, and may be defined as the following table.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 1 | 1 | 0 | 1 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

The channel interleaver implements time-first mapping of a modulation symbol of the PUSCH.

Now, UCI transmission through a PUCCH is described.

The PUCCH is used only for UCI transmission. For this, the PUCCH supports multiple formats. A PUCCH having a different number of bits per subframe can be used according to a modulation scheme which is dependent on the PUCCH format. The PUCCH format 1 is used for transmission of an SR. The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used.

Figure 4:
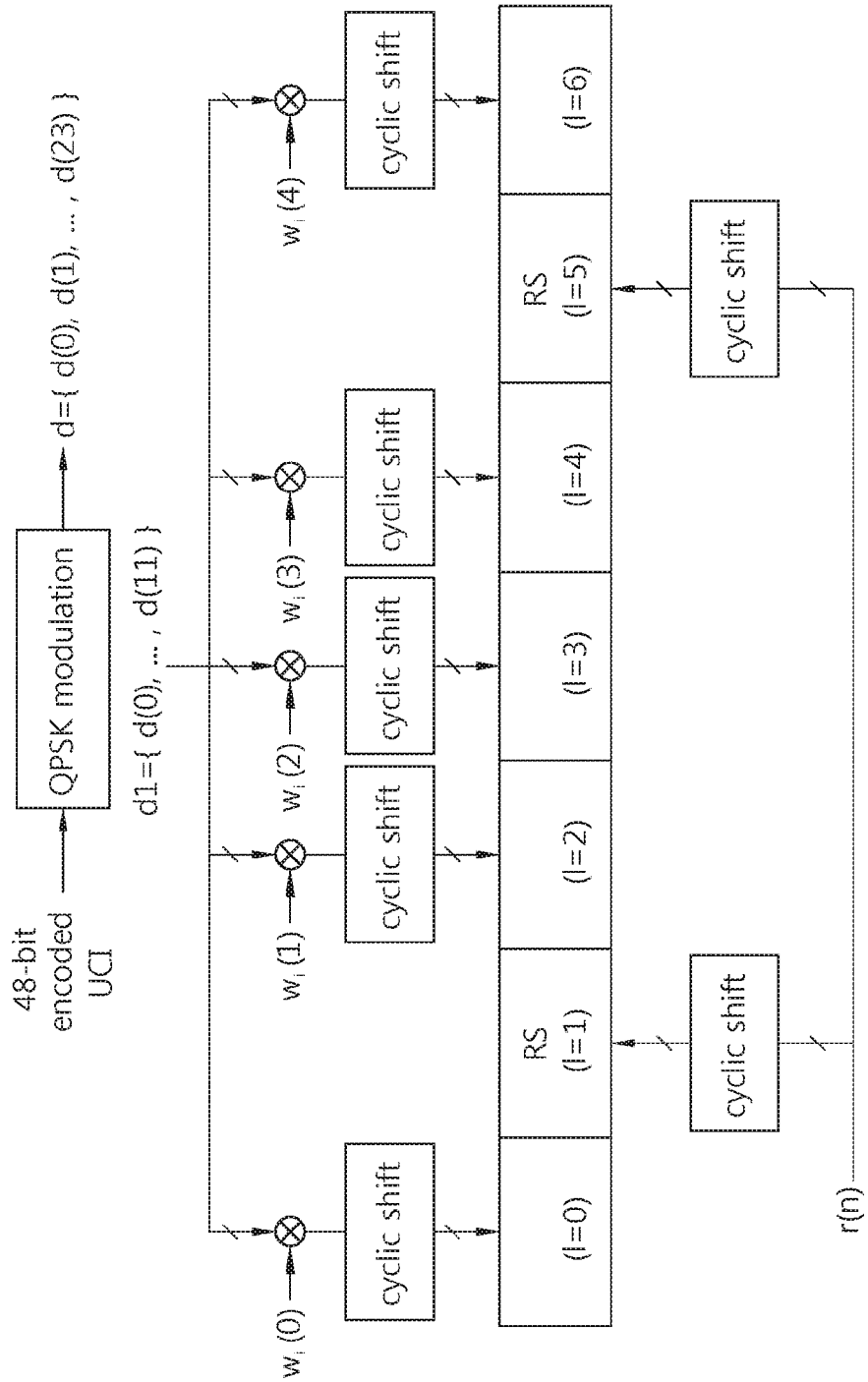
FIG. 4 shows an example of a structure of a PUSCH format 3 in a normal cyclic prefix (CP) case.

FIG. 4 shows an example of a structure of a PUCCH format 3 in a normal CP case.

In preparation for a case where the number of bits required for UCI transmission is insufficient with the use of a plurality of serving cells, the PUCCH format 3 is additionally introduced in addition to a PUCCH format of the existing 3GPP LTE PUCCH.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for a UCI signal.

A symbol sequence $d=\{d(0), d(1), \ldots, d(23)\}$ is generated by performing QPSK modulation on a 48-bit encoded UCI (e.g., encoded ACK/NACK). d(n)(n=0, 1, . . . , 23) is a complex-valued modulation symbol. The symbol sequence d can be regarded as a set of modulation symbols. The number of bits of the UCI or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 4, the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of the following table can be selected in accordance with an orthogonal sequence index i.

TABLE 3

| Index (i) | $[w_i(0), w_i(1), w_i(2), w_i(3), w_i(4)]$ |
| --- | --- |
| 0 | $[+1, +1, +1, +1, +1]$ |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the subframe can use different orthogonal sequence indices.

Two RS OFDM symbols are transmitted by mapping an RS sequence used for demodulation of UCI.

Channel coding for the PUCCH format 3 is as follows.

UCI (e.g., CSI) $u_0, u_1, \ldots, u_{A-1}$ (where A is the number of bits of the UCI) is subjected to channel coding to generate an encoded bit sequence $q_0, q_1, \ldots, q_{B-1}$. B is the number of bits capable of transmitting a corresponding PUCCH. Since the PUCCH format 3 can transmit coded UCI of 48 bits, B=48.

The PUCCH format 3 may transmit up to 48 bits, but channel coding uses a basis sequence for a (32, A) block code of Table 1. Therefore, according to whether the number A of UCI bits is greater than the number of RM bases (or also referred to as a basis sequence), coding is achieved as follows. According to Table 1, the number of RM bases is 11.

If A<=11, the following is satisfied.

An intermediary sequence $b_0, b_1, \ldots, b_{31}$ for channel coding is generated as follows.

$$b_i = \overset{A-1}{\underset{n=0}{Q}} (o_n EM_{i,n}) \bmod 2 \qquad \text{[Equation 4]}$$

Herein, i=0, 1, . . . , 31, and $M_{i,n}$ is a basis sequence for the (32, 0) block code of Table 1.

A control information bit sequence $q_0, q_1, \ldots, q_{B-1}$ is generated by circularly repeating the intermediary sequence $b_0, b_1, \ldots, b_{31}$ as follows.

$$q_i = b_{(i \bmod 32)} \qquad \text{[Equation 5]}$$

Herein, i=0, 1, . . . , B−1.

If 11<A<=21, the following is satisfied.

Two intermediary sequences $b^1_i$ and $b^2_i$ are generated as follows.

$$b^1_i = \overset{(A/2)-1}{\underset{n=0}{Q}} (u_n EM_{i,n}) \bmod 2, \qquad \text{[Equation 6]}$$

$$b^2_i = \overset{A-(A/2)-1}{\underset{n=0}{Q}} (u_{(A/2)+n} EM_{i,n}) \bmod 2$$

Herein, i=0, 1, . . . , 23.

The control information bit sequence $q_0, q_1, \ldots, q_{B-1}$ is obtained by concatenating the intermediary sequences.

$$q_i = b^1_j, q_{i+1} = b^1_{j+1}, q_{i+2} = b^2_j, q_{i+4} = b^2_{j+1} \qquad \text{[Equation 7]}$$

If A<=11, since one RM block code is used, this is called a single RM. If A>11, since two RM block codes are used, this is called a dual RM.

Now, UCI transmission is described according to an embodiment of the present invention.

Hereinafter, 1$^{st}$ UCI is referred to as HARQ ACK/NACK (hereinafter, simply referred to as HARQ ACK or A/N), and 2$^{nd}$ UCI is referred to as CSI, and this is for exemplary purposes only.

The HARQ ACK and the CSI may include UCI for one or more serving cells. For example, if the HARQ ACK is 10 bits, 2 bits may include ACK for a primary cell, and the remaining bits may include ACK for a secondary cell. 1-bit HARQ ACK may indicate ACK or NACK for one DL packet. Alternatively, 1-bit HARQ ACK may indicate bundled ACK or multiplexed ACK. ACK bundling is for combining ACK/NACK bits for a plurality of data packets by using a logical AND operation. Spatial bundling is for bundling ACK/NACK for a plurality of codewords when the plurality of codewords are received within one PDSCH. Time-domain bundling is bundling of ACK/NACK for a plurality of data packets received in different subframes. Frequency-domain bundling is bundling of ACK/NACK for a plurality of data packets received in different cells.

As a plurality of serving cells are introduced and as the number of UCI types is increased, it is necessary to transmit various types of UCI through one UL channel. For example, HARQ ACK and CSI may be transmitted simultaneously through a PUCCH. According to the existing PUCCH format 3 structure, the HARQ ACK and the CSI may be transmitted by being generated as one codeword (corresponding to a control information bit sequence).

According to the conventional PUCCH format 3, 48-bit coded UCI may be transmitted, a payload of UCI before coding (i.e., a length of a UCI bit sequence for which RM coding is performed) is up to 22 bits. The 22 bits may not be able to satisfy an increasing UCI capacity.

Although the following description is based on the structure of the PUCCH format 3 described in FIG. 4 and corresponding channel coding, this is for exemplary purposes only. A channel may be changed to a PUSCH or other different channels, and thus the number of bits that can be transmitted may also be changed. Channel coding is described based on an RM code, but may also be applied to well-known other code blocks.

Hereinafter, a UCI bit sequence $u_0, u_1, \ldots, u_{A-1}$ may be defined variously. For example, if UCI includes HARQ ACK, it may be expressed as $\{u_0, u_1, \ldots, u_{A-1}\} = \{AN_0, AN_1, \ldots AN_{A-1}\}$. If the UCI includes CSI, it may be expressed as $\{u_0, u_1, \ldots, u_{A-1}\} = \{CSI_0, CSI_1, \ldots, CSI_{A-1}\}$. If the UCI includes HARQ ACK and CSI, it may be expressed as $\{u_0, u_1, \ldots,$ $u_{A-1}$} = {$AN_0, AN_1, \ldots, AN_{K-1}, CSI_0, CSI_1, \ldots$}. Herein, a HARQ ACK bit is mapped to an index preceding that of a CSI bit.

As shown in FIG. 4, the PUCCH format 3 uses QPSK modulation for the 48-bit coded UCI. The number of coded bits may be increased when using a modulation scheme (e.g., 16-QAM (quadrature amplitude modulation), 64-QAM, etc.) having a higher order than QPSK. For example, when using 16-QAM, 96-bit coded UCI may be transmitted through the PUCCH format 3.

However, a bit error rate (BER) is increased when a higher order modulation scheme is used, which may have an effect on transmission reliability of UCI.

In channel coding of the PUCCH format 3 of the conventional 3GPP LTE, if the total number of bits of the UCI is greater than 11, dual RM coding is performed. This means that a bit sequence of the UCI is input to two RM encoders by being divided into two.

According to the proposed embodiment, it is proposed to increase the number of RM encoders when using a modulation scheme having a higher order than QPSK. For example, when using QPSK, encoding may be performed by using 2 RM encoders, and when using 16-QAM, encoding may be performed by using 3 or 4 RM encoders.

Figure 5:
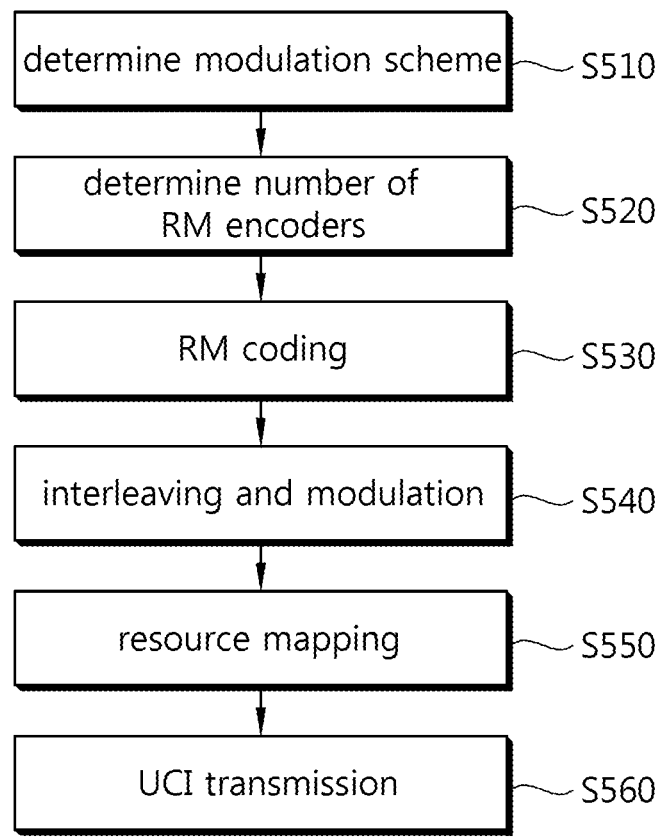
FIG. 5 is a flowchart showing a UCI transmission method according to an embodiment of the present invention.

FIG. 5 is a flowchart showing a UCI transmission method according to an embodiment of the present invention.

It is assumed hereinafter that $C_{QPSK}$ denotes the maximum number of RM encoders when using QPSK, $O_m$ denotes a length of a UCI bit sequence (i.e., the number of bits of UCI to be transmitted), and a (32, O) RM code of Table 1 is used.

In step S510, a wireless device determines a UL channel and/or a corresponding modulation scheme. It is assumed herein that a PUCCH format 3 and 16-QAM having a higher order than QPSK are selected.

In step S520, the wireless device determines the number C of RM encoders.

In one embodiment, when a modulation order is p(p>2), the number of RM encoders may satisfy: C=p. Alternatively, the number of RM encoders may satisfy: C=q*p (q>=1).

In another embodiment, if m=(the number of encoded bits possible in a corresponding modulation scheme)/(the number of encoded bits possible in QPSK), the maximum number of RM encoders may be defined to satisfy: $C=mC_{QPSK}$. In the conventional PUCCH format 3 structure, when using 16-QAM, m=96/48=2 and the maximum number of RM encoders satisfies: $C=mC_{QPSK}=2*2=4$./

In step S530, RM coding is performed on UCI. When C (32, O) RM encoders are used, a UCI bit sequence is divided by C sub-sequences, and each sub-sequence is given as an input of an RM encoder. A length of one sub-sequence may be less than or equal to 11, and a length between respective sub-sequences may be less than or equal to 1.

The wireless device may perform RM coding by using k RM encoders. $1<=k<mC_{QPSK}$, and k may be given in a higher layer. Alternatively, if $O_{UCI}>O$, the RM coding may be performed by using $C_{QPSK}$ RM encoders.

The following is a pseudo-code for deriving a length of sub-sequences to be input to respective RM encoders. Ai denotes a length of an i-th sub-sequence.

Figure 6:
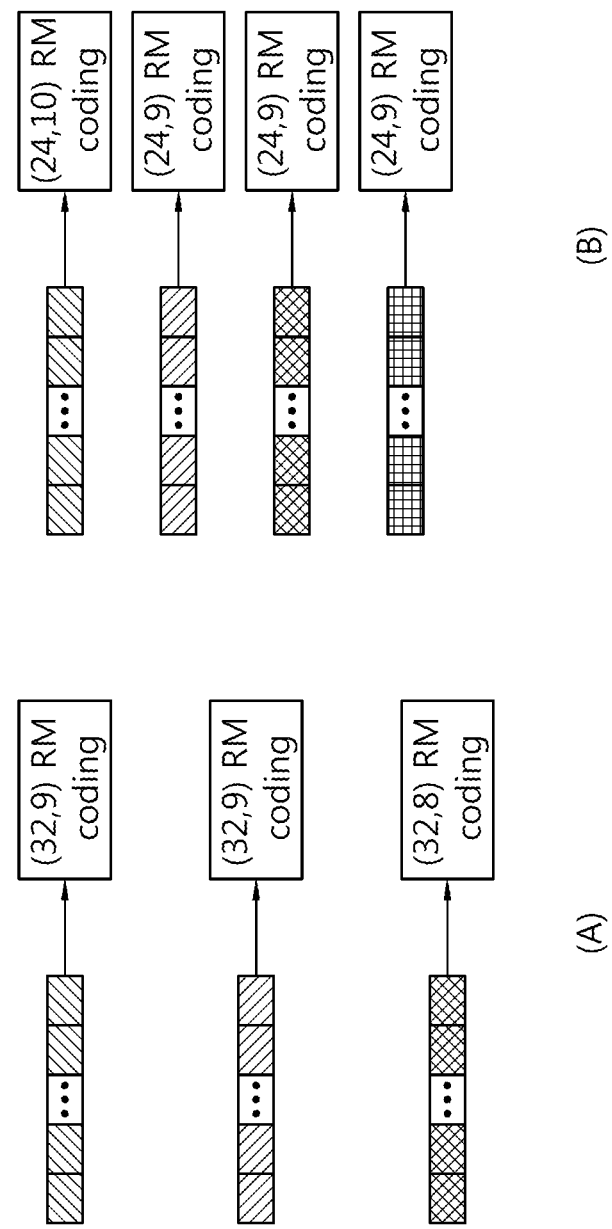
FIG. 6 shows an example of Reed-Muller (RM) coding.

Set temp=$O_{UCI}$, i=0
while i<C
Ai=ceil{temp/(C−i)}
temp=temp−Ai
i=1
end while
FIG. 6 shows an example of RM coding.

FIG. 6(A) is an example of using $O_{UCI}$=26, C=3, and a (32, O) RM encoder of Table 1. A UCI bit sequence is divided into 3 sub-sequences respectively having lengths of 9, 9, and 8, and the sub-sequences are input to respective RM encoders. A difference of a length of each bit sequence is less than or equal to 1.

FIG. 6(B) is an example of using $O_{UCI}$=37, C=4, and a (24, O) RM encoder. A UCI bit sequence is divided into 4 sub-sequences respectively having lengths of 10, 9, 9, and 9, and the sub-sequences are input to respective RM encoders.

Referring back to FIG. 5, in step S540, UCI which is encoded with RM coding is modulated by using a corresponding modulation scheme, and thus modulation symbols are generated. When using 16-QAM, a symbol sequence d={d(0), d(1), . . . , d(23)} may be generated by modulating 96-bit encoded UCI.

When L denotes the number of encoded UCI bits and M denotes an output size of an RM encoder, an output sequence of an i-th RM encoder may be expressed as {$b_{i,0}, b_{i,1}, \ldots, b_{i,N-1}$}, and an encoded UCI sequence may be expressed as {$b_0, b_1, \ldots, b_{mL-1}$}.

Bits in an encoded UCI bit sequence may be sequentially mapped to a corresponding modulation symbol.

Alternatively, the bits in the encoded UCI bit sequence may be interleaved and thereafter may be mapped to the corresponding modulation symbol.

In a first embodiment, an output of each RM encoder may be sequentially mapped in unit of 2 m bits. Coded bits constituting each modulation symbol may be derived from an output of the same RM encoder. The following is an example of a pseudo-code for interleaving.

Set j=0, k=0
while j<mL
i=mod {floor(i/2 m),2 m}
$b_j=b_{i,k}$
j=j+1
k=2 m floor(i/(2 mC))+mod {j,2 m}
end while In a second embodiment, coded bits constituting each modulation symbol may be derived from outputs of different RM encoders. The output of the respective RM encoders may be uniformly distributed to 2m bits corresponding to the modulation symbol. The following is an example of a pseudo-code for interleaving.

Set i=0, j=0, k=0
while j<mL
$b_j=b_{i,k}$
j=j+1
i=mod {i+1+(C−1)floor(j/C),C}
k=k+floor(j/C)
end while In step S550, the modulation symbols are mapped to corresponding RBs. When using a PUCCH format 3, mapping may be performed as shown in FIG. 4.

In step S560, UCI may be transmitted through a UL channel.

Now, coding and interleaving will be described in a case where UCI includes multiple types of UCI. For clarity, it is assumed that the UCI includes HARQ ACK and CSI.

Figure 7:
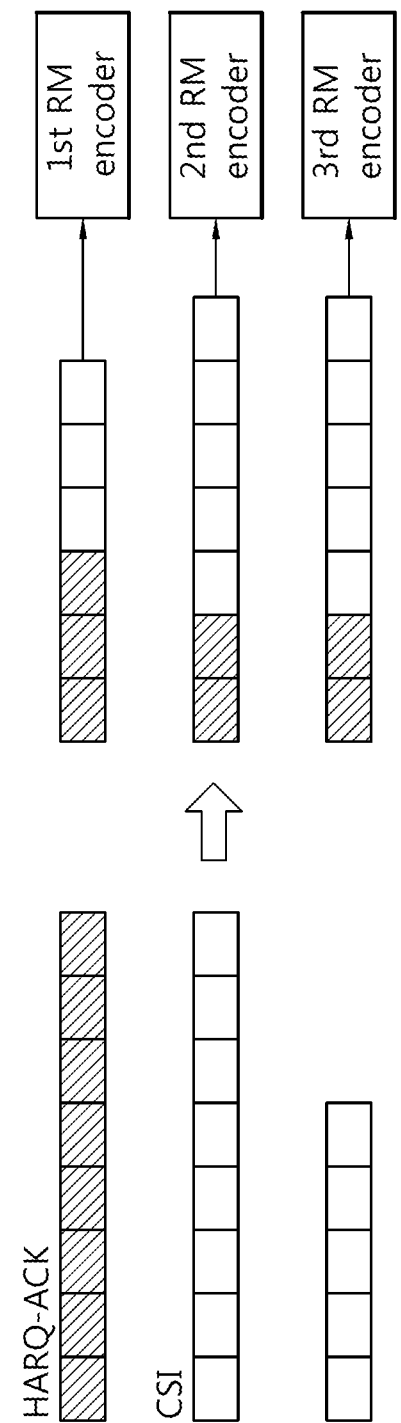
FIG. 7 shows coding according to an embodiment of the present invention.

FIG. 7 shows coding according to an embodiment of the present invention.

Although it is assumed that 3 RM encoders are considered, HARQ ACK has 8 bits, and CSI has 13 bits, this is for exemplary purposes only.

A HARQ ACK bit and a CSI bit may be uniformly distributed to the 3 RM encoders.

If the number of HARQ ACK bits is even, the same number of HARQ ACK bits are input to two RM encoders. If the number of HARQ ACK bits is odd, the remaining one HARQ ACK bit is input to a $1^{st}$ RM encoder (or a $2^{nd}$ encoder).

In addition, the CSI bit is mapped such that a final length of an encoder (herein, the $1^{st}$ RM encoder) including a relatively greater number of HARQ ACK bits has an input length relatively less than or equal to that of the $2^{nd}$ RM encoder.

It is assumed that a bit sequence input to the $1^{st}$ RM encoder is a $1^{st}$ sub-sequence, and a bit sequence input to the $2^{nd}$ RM encoder is a $2^{nd}$ sub-sequence. A less number of CSI bits may be allocated to a sequence having a greater number of HARQ ACK bits between the $1^{st}$ and $2^{nd}$ sub-sequences. If HARQ ACK 3 bits are allocated to the $1^{st}$ sub-sequence, HARQ ACK 2 bits are allocated to the $2^{nd}$ sub-sequence, and HARQ ACK 2 bits are allocated to a $3^{rd}$ sub-sequence, then the number of CSI bit allocated to the $2^{nd}$ and $3^{rd}$ sub-sequences may be less than that of the $1^{st}$ sub-sequence.

This is to further intensify error correction capability of an RM encoder having a great number of HARQ ACKs having a high importance.

Figure 8:
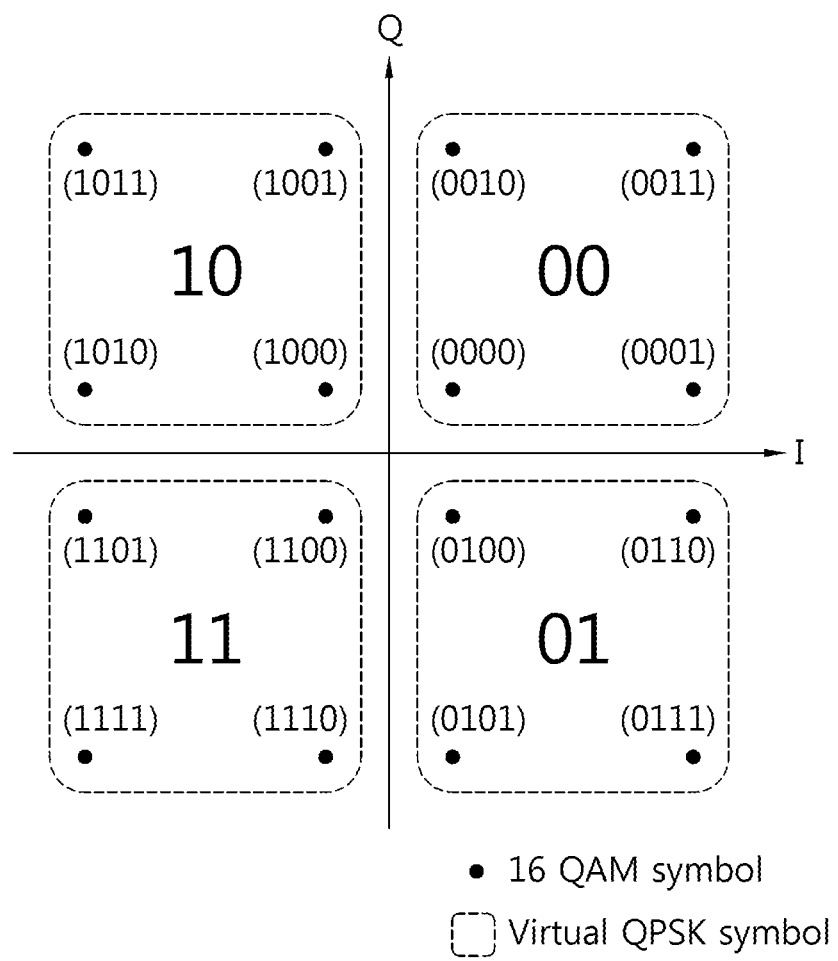
FIG. 8 shows an example of a 16-QAM (quadrature amplitude modulation) constellation for mapping according to an embodiment of the present invention.

FIG. 8 shows an example of a 16-QAM constellation for mapping according to an embodiment of the present invention.

A HARQ ACK bit is mapped to a most significant bit (MSB) among 2 m bits constituting a modulation symbol. The modulation symbol corresponding to HARQ ACK may be generated in a format of QPSK or BPSK having a relatively long Euclidean distance.

Alternatively, the HARQ ACK bit may be mapped to a symbol having a greatest Euclidean distance.

In FIG. 8, it is shown a case of mapping HARQ ACK 2 bits to MSB 2 bits among 4 bits constituting 16-QAM.

HARQ ACK may be configured such that the number of coded bits or the number of symbols is greater than that of CSI.

For example, three (32, O) RM encoders may be used if 16-QAM is used, the number of HARQ ACK bits is less than or equal to 11, and the total number of available UCI bits is less than or equal to 33. Four (32, O) RM encoders may be used if the number of HARQ ACKs is less than or equal to 21 and the total number of UCI bits is greater than 33 and less than or equal to 44.

For another example, one RM encoder for HARQ ACK and two RM encoders for CSI may be used if 16-QAM is used, the number of HARQ ACK bits is less than or equal to 11, and the total number of available UCI bits is less than or equal to 33. Four RM encoders may be used if the number of HARQ ACK bits is less than or equal to 21 and the total number of UCI bits is greater than 33 and less than or equal to 44.

The number of RM encoders and a method of generating a sub-sequence which is input to each RM encoder may be determined according to the number of HARQ ACK bits and the number of CSI bits, or may be configured by a BS.

Figure 9:
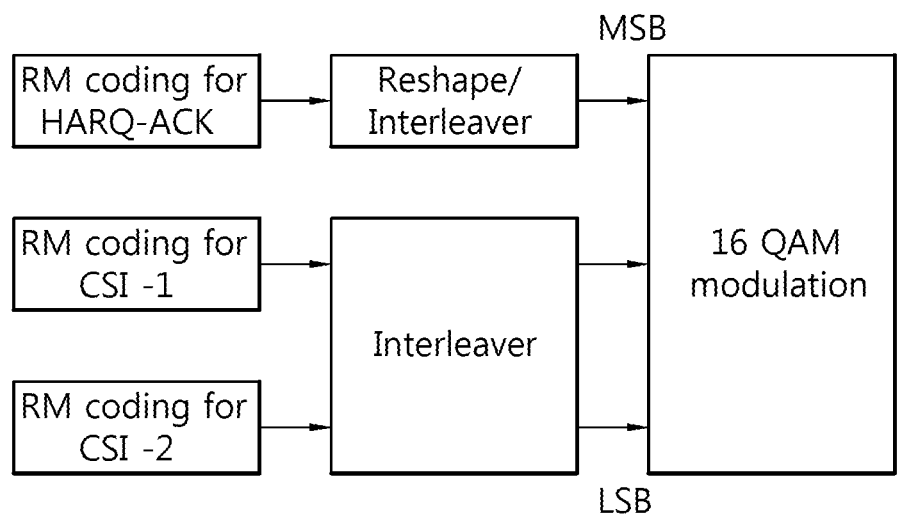
FIG. 9 shows coding according to an embodiment of the present invention.

FIG. 9 shows coding according to an embodiment of the present invention.

It is assumed that a HARQ ACK bit is input to a $1^{st}$ RM encoder to output a $1^{st}$ coded sequence, a CSI bit is input to a $2^{nd}$ RM encoder to output a $2^{nd}$ coded sequence, and a CSI bit is input to a $3^{rd}$ RM encoder to output a $3^{rd}$ coded sequence.

Mapping may be performed in such a manner that a $1^{st}$ output sequence corresponding to HACK ACK is uniformly distributed to two slots. For example, a half of the $1^{st}$ output sequence may be mapped to a $1^{st}$ slot, and the other half of the $1^{st}$ output sequence may be mapped to a $2^{nd}$ slot. A coded bit in the $1^{st}$ coded sequence may be mapped to MSB 2 bits among 4 bits constituting a 16-QAM symbol.

The $2^{nd}$ and $3^{rd}$ coded sequences corresponding to CSI may be interleaved and thereafter may be mapped to the 16-QAM symbol.

Figure 10:
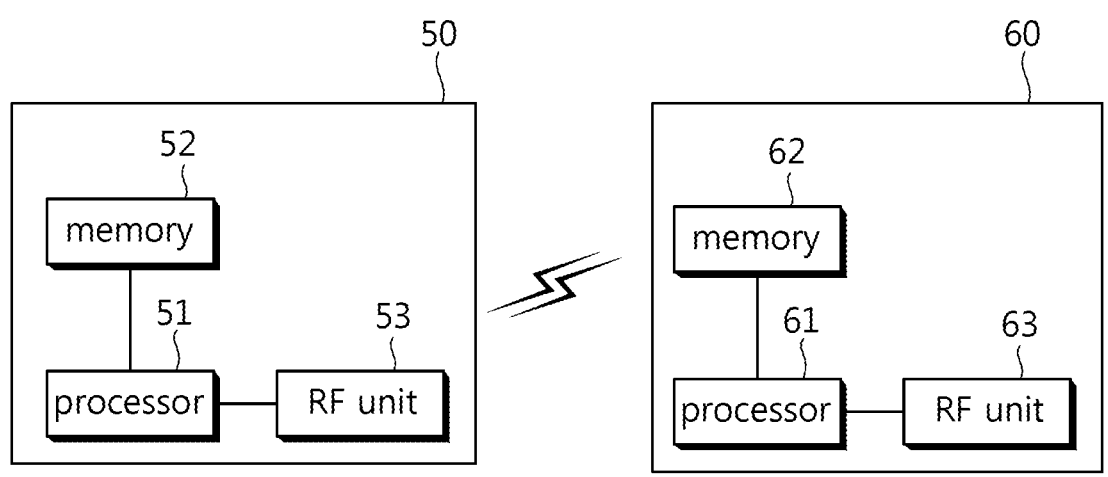
FIG. 10 is a block diagram showing a wireless communication system according to an embodiment of the present invention.

FIG. 10 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may receive UCI, and may decode the UCI. Alternatively, when the aforementioned embodiment is applied to downlink control information transmission, the processor 51 may implement the aforementioned embodiment in the downlink control information transmission.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61. The processor 61 may implement UCI encoding and UCI transmission.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting uplink control information in a wireless communication system, the method comprising:
determining a total number of a plurality of Reed-Muller (RM) encoders according to a total number of bits of a bit sequence indicating the uplink control information;
generating a plurality of sub-sequences by dividing the bit sequence according to the determined total number of the plurality of RM encoders;
generating a coded sequence by inputting each of the plurality of sub-sequences to a respective one of the plurality of RM encoders;

generating a plurality of modulation symbols by mapping the coded sequence according to a modulation scheme; and transmitting the plurality of modulation symbols on an uplink channel, wherein the plurality of sub-sequences have a same length or a difference of the length is 1.

2. The method of claim 1, further comprising
determining the modulation scheme according to the total number of bits of the bit sequence.

3. The method of claim 1, wherein the plurality of modulation symbols are transmitted in two slots in a subframe.

4. The method of claim 1, wherein a modulation order of the modulation scheme is greater than 2.

5. The method of claim 1, wherein the determined total number of the plurality of RM encoders is greater than 2.

6. The method of claim 1, wherein the total number of bits of the bit sequence is greater than 11.

7. The method of claim 1,
wherein the uplink control information includes first uplink control information and second uplink control information, and
wherein a coded bit corresponding to the first uplink control information is mapped to a bit corresponding to a most significant bit (MSB) for the plurality of modulation symbols.

8. The method of claim 7, wherein the first uplink control information includes a hybrid automatic repeat request (HARQ) positive-acknowledgement (ACK)/negative-acknowledgement (NACK), and the second uplink control information includes channel state information (CSI).

9. The method of claim 1, wherein the uplink channel is a physical uplink control channel (PUCCH) or a physical uplink shared channel (PUSCH).

10. An apparatus for transmitting uplink control information in a wireless communication system, the apparatus comprising:
a transceiver configured to transmit and receive a radio signal; and
a processor operatively coupled to the transceiver, wherein the processor is configured to:
determine a total number of a plurality of Reed-Muller (RM) encoders according to a total number of bits of a bit sequence indicating the uplink control information;
generate a plurality of sub-sequences by dividing the bit sequence according to the number of the plurality of RM encoders;
generate a coded sequence by inputting each of the plurality of sub-sequences to a respective one of the plurality of RM encoders;
generate a plurality of modulation symbols by mapping the coded sequence according to a modulation scheme; and
transmit the plurality of modulation symbols on an uplink channel,
wherein the plurality of sub-sequences have a same length or a difference of the length is 1.

11. The apparatus of claim 10, wherein the processor determines the modulation scheme according to the total number of bits of the bit sequence.

12. The apparatus of claim 10,
wherein the uplink control information includes first uplink control information and second uplink control information, and
wherein a coded bit corresponding to the first uplink control information is mapped to a bit corresponding to a most significant bit (MSB) for the plurality of modulation symbols.

13. The apparatus of claim 12, wherein the first uplink control information includes a hybrid automatic repeat request (HARQ) positive-acknowledgement (ACK)/negative-acknowledgement (NACK), and the second uplink control information includes channel state information (CSI).

14. The apparatus of claim 10, wherein the uplink channel is a physical uplink control channel (PUCCH) or a physical uplink shared channel (PUSCH).

* * * * *